(12) United States Patent
Naderi

(10) Patent No.: US 8,398,930 B2
(45) Date of Patent: Mar. 19, 2013

(54) SYSTEM FOR EXTERNALLY HOLDING A CATALYST BED IN RADIAL-FLOW REACTOR

(75) Inventor: Abdol Hossein Naderi, Poitiers (FR)

(73) Assignee: Euroslot, Scorbe Clairvaux (FR)

( * ) Notice: Subject to any disclaimer, the term of this patent is extended or adjusted under 35 U.S.C. 154(b) by 152 days.

(21) Appl. No.: 12/995,521

(22) PCT Filed: Jun. 2, 2009

(86) PCT No.: PCT/IB2009/005819
§ 371 (c)(1),
(2), (4) Date: Dec. 1, 2010

(87) PCT Pub. No.: WO2009/147503
PCT Pub. Date: Dec. 10, 2009

(65) Prior Publication Data
US 2011/0104020 A1    May 5, 2011

(30) Foreign Application Priority Data

Jun. 2, 2008   (FR) ...................... 08 03007

(51) Int. Cl.
*B01J 8/02* (2006.01)
*B01J 8/00* (2006.01)
*B01J 8/08* (2006.01)
*B01J 8/44* (2006.01)
*B01J 35/02* (2006.01)
*B01J 19/00* (2006.01)

(52) U.S. Cl. ........ 422/218; 422/129; 422/187; 422/211; 422/213; 422/216; 422/219; 422/220; 422/221; 422/311

(58) Field of Classification Search ............... 422/129, 422/211, 213, 216, 218–221, 187
See application file for complete search history.

(56) References Cited

U.S. PATENT DOCUMENTS

| 4,198,002 A * | 4/1980 | McClain ...................... 239/568 |
| 6,224,838 B1 | 5/2001 | Schulz et al. |
| 2008/0107575 A1 * | 5/2008 | Vetter et al. ................. 422/211 |

FOREIGN PATENT DOCUMENTS

| EP | 0483975 A1 | 5/1992 |
| WO | 0166239 A2 | 9/2001 |

OTHER PUBLICATIONS

World IP Organization. "International Search Report." PCT/IB2009/005819, Applicant: Euroslot, Mailed: Jul. 20, 2009.

* cited by examiner

*Primary Examiner* — Walter D Griffin
*Assistant Examiner* — Natasha Young
(74) *Attorney, Agent, or Firm* — Millen, White, Zelano & Branigan, P.C.

(57) ABSTRACT

The invention relates to a system for externally holding a catalyst bed in a radial flow catalytic reactor, comprising a plurality of hollow longitudinal duct elements (2) regularly distributed in a peripheral ring around a central space (3) containing the catalyst bed and having a front filtering wall (5) facing the catalyst for the radial intake of a fluid to be treated in the catalyst bed (3). Each of the duct elements (2) is laterally defined by two lateral walls (6) radially oriented in the reactor (1) and comprising an assembling means for assembly with the respectively adjacent elements (2') of the male member in female member (7, 8) type.

20 Claims, 3 Drawing Sheets

SYSTEM FOR EXTERNALLY HOLDING A CATALYST BED IN RADIAL-FLOW REACTOR

The present invention relates to the conception and construction of a system for retaining a bed of catalyst on the outward side in a radial-flow catalytic reactor, which system takes the form of distinct hollow external conduit elements.

The system according to the invention is more specifically intended for use in reactors performing catalytic methods for converting hydrocarbons in the petrochemical field, notably for the reforming or cracking of petroleum.

The radial-flow catalytic reactors that are used conventionally comprise a catalyst bed made of solid particles enclosed inside a cylindrical vessel. The space containing the bed of catalyst is externally bounded by an outer filtering wall belonging to a feed conduit which forms a peripheral annulus parallel to the axis of the reactor, and it is internally bounded by a likewise filtering inner wall that belongs to a central collector, placed along the axis of the reactor. In the bottom of the reactor, the external feed conduit is supported by a circular ring. The bed of catalyst particles situated between the external conduit and the central collector may be either standing fixed or moving and driven in continuous circulation.

The external conduit is connected to means for admitting fluid into the reactor. It channels this fluid vertically along the wall of the reactor and diffuses it in the radial direction into the bed of catalyst. Having passed through the bed of catalyst, the fluid resulting from the catalytic reaction arrives in the central collector, from where it is directed to the outlet of the reactor.

Such reactors operate at high temperatures, that are of the order of 550° C., and they are subjected to substantial and sometimes sharp variations in temperature.

In existing reactors there are found two types of catalyst external retention systems that take the form of external peripheral conduits.

Such systems may be in the form of a single one-piece cylindrical basket. This offers the advantage of a surface for contact with the catalyst that is smooth and uniform, but entails difficulties in withstanding the high increases in temperature and the high pressure applied to the basket by the fluid in the reactor. Further, it is difficult to repair the basket should it become damaged.

To address this problem, it has been proposed for the conduit to take the form of distinct tubular longitudinal elements which are arranged beside one another at the periphery of the reactor, each covering an annular sector. A reactor comprising such conduit elements is notably described in document WO 01/66239. In that patent document, it may be seen that the various conduit elements show a semi-oval or trapezoidal cross section so that they can be moved radially while the reactor is being constructed.

A cellular system such as this offers the advantage of great ease of repair because only the damaged element need be replaced. On the other hand, it does have a number of disadvantages, notably the fact that the surface for contact with the catalyst is uneven. The presence of dead regions between the adjacent elements is particularly harmful because these regions are the site of additional thermal expansions and the catalyst has a tendency to burn and become damaged here when the reactor is running at high temperatures. This results in lower catalytic efficiency and an attack which is detrimental to the metallic elements.

In order to create an obstacle between the adjacent conduit elements, the prior art has made provision for a sealing plate to be welded at the intersection of the elements, on the internal surface of the adjacent elements. These plates, which are made of a metallic material, just like the conduit elements, have low mechanical strength. Thence it occurs often, when the reactor is operating at high temperatures, that the plates move and open up access to dead regions. Another disadvantage with the system of the prior art, which is again associated with the shape of the conduit elements and with the way the entire external shell of the catalytic bed is constructed, lies in the fact that the conduit elements have to be held at the periphery of the reactor by retaining rings positioned at regular intervals along the entire height thereof. These rings with their retention space create disturbances in the flow of catalyst. For all of these reasons, the operation of the reactor is often somewhat unsatisfactory.

The present invention sets out to remedy the disadvantages of the systems for the external retention of the catalyst in existing catalytic reactors, notably the disadvantages set out hereinabove, by proposing a cellular system, that is to say a system made up of distinct hollow conduit elements, which combines good ease of assembly and repair with improved operating capability, notably thanks to a surface for contact with the catalyst which is uniform over the entire periphery of the reactor, which ensures good sealing against the catalyst at the junction between the adjacent elements, so that the catalyst is prevented from entering the dead regions between these elements, and which shows good mechanical strength, particularly when exposed to sharp variations and high increases in temperature. The invention also aims at providing catalytic efficient circulation in the annular space between the external conduit elements and the central collector, and at ensuring uniform distribution of fluid flow throughout the catalytic bed. The system according to the invention is also designed to have a fairly low cost of manufacture and of maintenance.

To this end, the invention proposes a system for the external retention of a bed of catalyst in a radial-flow catalytic reactor, which comprises a plurality of longitudinal hollow conduit elements evenly distributed in a peripheral annulus around a central space containing the bed of catalyst and having a front wall that is filtering in respect of the catalyst, for radially admitting a process fluid into the bed of catalyst. Each of the conduit elements is laterally bounded by two lateral walls which are directed radially in the reactor and which comprise means of assembly, of the male-in-female member type, with the respectively adjacent elements.

The catalytic reactor in which the system according to the invention is used comprises, in the conventional way, a space containing the radial bed of solid particles of catalyst, bounded on the outside by the hollow conduit elements arranged parallel to the axis of the reactor, resting against the internal wall thereof, so as to form an external peripheral annulus, fluid inlet means connected to the conduit elements, which feed the bed of particles radially, and a filtering central collector arranged along the axis of the reactor, receiving the fluid from the radial bed and connected to fluid outlet means.

The conduit elements, or sectors, that form the external conduit advantageously have a trapezoidal shape, the narrowest side being situated toward the inside of the reactor, so that these elements are easy to install in the reactor. They form a uniform annular volume around the catalyst. In the event of damage, only the damaged element is removed from the reactor and replaced.

The adjacent elements are not directly contiguous via their lateral walls. They are advantageously joined together via means of assembly of the male-in-female type, in the form of complementary profiles formed on the lateral walls of the elements. Each conduit element thus comprises a male assembly profile on one of its lateral walls and a female assembly profile on the other. Using such a system of assembly, there advantageously remains between two adjacent elements no passage toward a dead region into which the catalyst could infiltrate, and then stagnate and deteriorate therein. The male and female profiles advantageously extend and engage with one another continuously over the entire height of the elements. The assembly between the adjacent elements is robust and able to withstand significant temperature variations, heat and the pressures applied in the reactor by the fluid. Thus, no dead region is created when the reactor is in operation. The efficiency of the catalytic reaction is therefore improved.

The external conduit of the reactor according to the invention is formed of similar conduit elements, which are assembled with one another in such a way as to form an annulus of uniform surface around the space containing the catalyst. The shape of the elements ensures that there are no preferential regions through which the fluid could pass.

In the conventional way, the size of the perforations in the filtering front wall, that is to say the wall directed toward the inside of the reactor, is chosen so as not to allow the particles of catalyst through but to allow the fluid to diffuse comprehensively through the wall.

The filtering front wall is preferably made of a V-section profile, forming slots running parallel to the axis of the reactor. The front wall thus advantageously has a smooth surface which does not damage the solid particles of catalyst.

In order to ensure the best uniformity of the surface for contact with the catalyst, according to one advantageous feature of the invention, the complementary male and female profiles are positioned near the front end of the lateral walls, that is to say near the end facing toward the inside of the reactor, and are configured in such a way as to ensure the continuity of the internal surface of the peripheral annulus, even at the regions where the adjacent elements are assembled with one another.

The assembly profiles are configured and arranged in such a way as to extend the surface of the filtering front walls in the regions between the elements.

The bed of catalyst externally delimited by such a system of modular elements advantageously has a radial thickness that is constant throughout the annular space of the reactor.

In some concrete preferred, although nonlimiting, embodiments of the invention, the means of assembly are designed to be fixed together by screw-fastening or stapling means which are preferably applied from the inside of the reactor when the elements are being installed and which are preferably set into the surface of the peripheral annulus, so as to ensure that the surface for contact with the catalyst is uniform and free of roughnesses. The screw-fastening or stapling together of the adjacent elements gives the assembly good mechanical strength.

According to some embodiments which, in industry practices, are preferred, the invention also has the following features, applied separately or in each of their technically feasible combinations.

In one preferred embodiment of the invention, the lateral walls comprise, near their rear ends, stops for assembly of the male-in-female member type. These stops, which also preferably run continuously over the entire height of the elements, are nested in one another at the same time as the male/female assembly profiles. They advantageously make it possible to maintain a constant separation between the adjacent elements over their entire depth, and irrespective of the temperature conditions to which the reactor may be subjected. In particular, even in the event of non-uniform and delayed expansion of the elements and of the reactor under the effect of heat, or in the event of deformation of the walls of the elements, the clearance between the adjacent elements remains the same, and the surface for contact with the catalyst remains smooth and continuous.

In addition, the elements thus assembled with one another form an assembly that is sufficiently rigid to be self-supporting. There is no need, as was the case with reactors of the prior art, to use retaining rings for holding the elements against the wall of the reactor. This fact proves to be particularly advantageous because, as was explained hereinabove, these rings disrupt the circulation of catalyst in the radial bed. Further, under the effect of heat, they are liable to deform and drop to the bottom of the reactor, damaging the particles of catalyst and the walls of the external conduit and of the central collector. The conduit elements according to the invention form a peripheral annulus that remains stable in the reactor without any retaining piece.

According to one advantageous feature of the invention, the lateral walls of the conduit elements further comprise, on their opposite face to the means of assembly, and slightly set back from the front wall, a rigid lateral reinforcement in the form of a flat. Each lateral wall therefore has a shape which can be likened to that of a T, the cross-bar of which is formed, on the one hand, by the assembly profile and, on the other hand, by the lateral reinforcement. Such a feature gives the assembly formed by the elements good compressive, torsional and bending strength.

According to one particularly advantageous feature of the invention, the conduit elements comprise means of gradually distributing the fluid stream in the longitudinal direction, over the height of the conduit elements.

In some preferred embodiments of the invention, these distribution means comprise a perforated plate fixed set back from the filtering front wall and the perforation density of which varies over its height. This density is greater in the lower part than in the upper part of the reactor. The perforation density can vary through the size of the perforations or equally it may vary through the number thereof.

Such a feature proves to be entirely advantageous in ensuring optimal reactor operating efficiency. Specifically, the catalyst is in the form of beads, the density of which is conventionally initially approximately equal to 850 kg/m$^3$. Under the effect of the friction experienced in the tubes that transfer the catalyst into the reactor, and in the reactor itself, notably against the surfaces of the external and central conduits, the particles of catalyst become worn during operation and their size decreases accordingly. Their density may therefore increase up to 1200 to 1400 kg/m$^3$. This phenomenon is all the more pronounced in the lower part of the reactor where the particles are crushed under the weight of the catalyst on top of them. The fluid has greater difficulty in passing through the bed of catalyst, which is more dense, in this lower part and tends of its own accord to diffuse for preference into the less dense upper parts. The efficiency of the reactor is thereby diminished because not all of the volume of catalyst is operating correctly. In addition, this lower part constitutes a region of significant heating and the catalyst and internal components of the reactor suffer greater damage here.

The system according to the invention makes it possible to alleviate this disadvantage by virtue of its means of gradually distributing the stream of fluid over the height of the elements. The greater perforations density of the plate in the lower part of the reactor actually forces the fluid to pass to a greater extent into this part of the radial bed. The size and number of perforations over the height of the plate are chosen to suit the particular catalytic reaction being carried out in the reactor, through calculations that are within the competence of the person skilled in the art so as to ensure optimum use of the particles of catalyst over the entire height of the bed of particulate material.

In preferred embodiments of the invention, the filtering front wall is supported at the rear by parallel annular reinforcements. A longitudinal rigid comb is positioned at right angles set back from this wall, substantially at the middle thereof, between the reinforcements. This comb advantageously enhances the mechanical strength of the filtering wall, while at the same time not introducing any disturbance into the stream of fluid. It is preferably welded to the reinforcements at the top and bottom of the elements so as to give the wall greater rigidity and firmness. Its teeth fit between the reinforcements over the entire height of the elements.

The perforated plate for distributing the gaseous stream is advantageously positioned resting against the annular reinforcements that support the filtering front wall, and welded to the lateral reinforcements of the lateral walls.

According to one advantageous feature of the invention, the system is designed in such a way as to allow the conduit elements to be installed easily in the reactor. For this purpose, it comprises a conduit element known as the lead element, intended to be the first one installed in the reactor, and a conduit element called the joining element, intended to be the last one installed and to close the annulus formed in the reactor by the elements successively installed. These lead and joining elements have special configurations. Their overall shape and their front and rear walls are similar to those of the other conduit elements. It is in terms of their lateral walls that they differ therefrom.

In preferred embodiments of the invention, the lead hollow conduit element is provided not on one, but on each, of its lateral walls with a female assembly member, and also preferably with a female assembly stop. It has no male assembly member. This element makes the subsequent fitting of the joining element at the end of the loop easier.

The joining element preferably has one lateral wall that is not provided with a female assembly profile. On its other lateral wall it comprises, in the normal way, a male assembly profile intended to be assembled with the female profile of the last installed adjacent element.

On its lateral wall that is not provided with a female profile, the joining element advantageously comprises a shoulder to accept an adjustable cover strip of the same shape as the male assembly profiles. This cover strip is positioned in such a way as to cover the female assembly profile of the adjacent element, which is preferably the lead element of the annulus, and, on the one hand, to seal the internal surface of the annulus against the catalyst and, on the other hand, to provide it with continuity, between this lateral wall and this adjacent element.

The joining element is preferably smaller in width than the other conduit elements. Its size is tailored so that it covers the annular space between the two elements adjacent to it.

This particular sector, which is the element intended to be the last one installed in the reactor, closes off the annulus of elements. On one side, it is assembled with the last element installed via its male assembly profile. On the other side, it accepts the adjustable cover strip which attaches to the still-free female profile of the lead conduit element.

It is thus easy to fit the annulus of elements in the reactor; this fitting ensures the continuity of the internal surface of the peripheral annulus and seals against particles of catalyst over this entire surface. It should be remembered here that the invention also relates to a method of constructing the external jacket of the catalytic bed in a radial-flow reactor by progressively assembling successive conduit elements like those produced in accordance with the invention, which are inserted axially in the reactor one after the other. It will also be understood that, by comparison with the embodiments of the prior art, the need for additional closure is limited to just one of the interfaces between adjacent elements. The need for external hooping of the assembly is also avoided in as much as the various elements are held together against any possibility of radial movement, something which adds to the solidity of the assembly once it has been built.

The various conduit elements may have a solid rear wall or a filtering rear wall, depending on the specific requirements. The reactor according to the invention also advantageously makes it possible to dispense with such a rear wall because the rigidity of the peripheral annulus obtained by the internal and external hoopings formed by the assembly profiles and stops is enough to confer enough mechanical strength even without there being any rigidifying rear wall.

The lateral walls of the elements may be solid or holed in such a way as to allow the fluid to circulate from one conduit element to the other.

These features notably provide good radial distribution of the flow of fluid in the external conduit.

In the lower part of the reactor, again according to the requirements, the longitudinal ends of the conduit elements may be open or closed. In the upper part, the elements are open to allow the fluid to enter. The size of the opening may vary according to the reaction. The opening may be bounded by sealing plates which each partially cover one conduit element, overlapping the elements adjacent to it. Cover strips are then advantageously provided to cover the gaps between the adjacent plates.

BRIEF DESCRIPTION OF THE FIGURES

The invention will now be more fully described in the context of preferred features and the advantages thereof, with reference to FIGS. 1 to 6 in which.

Figure 1:
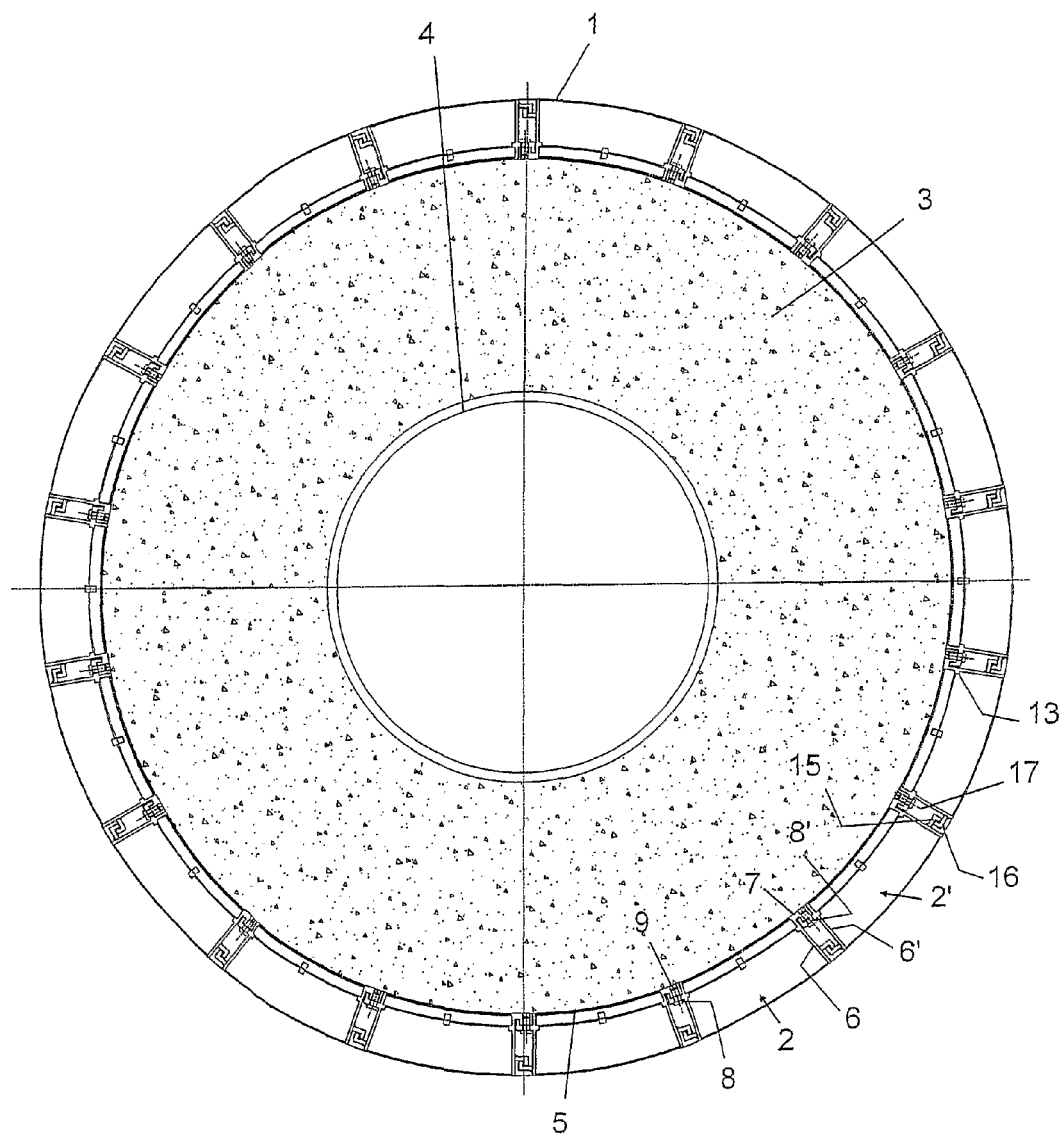
FIG. 1 depicts a reactor according to the invention, viewed in section on a transverse plane.

The reactor equipped with the system according to the invention is shown, viewed in section on a radial plane, in FIG. 1. Its constituent elements are made of metallic material.

It comprises a cylindrical vessel 1. Inside this vessel, resting against the internal wall thereof, are hollow conduit elements 2.

The conduit elements 2 have a trapezoidal overall shape. They are positioned one beside the other, parallel to the axis of the reactor, so that each occupies an annular sector at the periphery of the reactor.

The peripheral annulus formed by the conduit elements 2 externally delimits a space containing a radial bed of catalyst particles 3.

At the center of the reactor, in the middle of the radial bed, there is a central collector 4, in the form of a cylindrical basket with a filtering wall.

The fluid that is to be converted is admitted to the external conduit of the reactor, formed by the conduit elements 2 assembled with one another, by conventional fluid inlet means which have not been depicted in the figure. Depending on circumstance, the fluid enters either from the top or from the bottom of the reactor, usually from the top. The external conduit distributes the fluid radially through the bed of particles 3, in which it diffuses radially until it reaches the central collector 4, in the converted state. The central collector 4 is connected to fluid outlet means, likewise conventional. These means are situated at the opposite longitudinal end of the reactor to the end at which the fluid enters.

Each of the conduit elements 2 comprises a filtering front wall 5 or strainer. The mesh size of this wall is chosen to allow the fluid to pass comprehensively, but to block catalyst particles so as to keep them in the space 3. This front wall, directed toward the axis of the reactor, preferably consists of a V-section profile, the narrowest part of the V being directed toward the wall of the vessel 1. To allow the fluid through, the profile forms slots parallel to the axis of the reactor.

The front wall 5 is supported by lateral walls 6 which may be plates welded to the front wall or may be made as one piece with this front wall. The lateral walls 6 are positioned radially with respect to the reactor.

The lateral walls 6, 6' of the adjacent conduit elements form complementary male-in-female assembly profiles. Thus, one lateral wall 6 of a first conduit element forms a male profile 7, which fits into a female profile 8' formed on the lateral wall 6' of an adjacent conduit element.

The assembly profiles are welded to the respective lateral walls which bear them. They run continuously over the entire height of the elements.

The complementary profiles 7 and 8' fitted one inside the other are fixed together by means of screws or pins 9, which are inserted at the time of assembly from inside the reactor, at regular intervals over the height of the elements, notably every 1 to 2 m. The screws or pins 9 are fully set into the profiles so that they do not protrude into the radial bed of particles 3.

The assembly profiles 7, 8 are positioned near the front ends, that is to say toward the axis of the reactor, of the lateral walls, and in such a way that the annulus formed by the conduit elements 2 has an internal surface for contact with the catalyst that is uniform over the entire periphery of the reactor. The adjacent conduit elements are therefore assembled with no break in surface continuity with the filtering front walls 5 of the elements.

The conduit elements 2 assembled with one another form a uniform and even annular annulus around the bed of catalyst 3, which is kept in a well delineated annular volume. As may be seen in the figure, there is not, in the reactor, any dead region into which the catalyst could infiltrate and in which it could stagnate.

Figure 2:
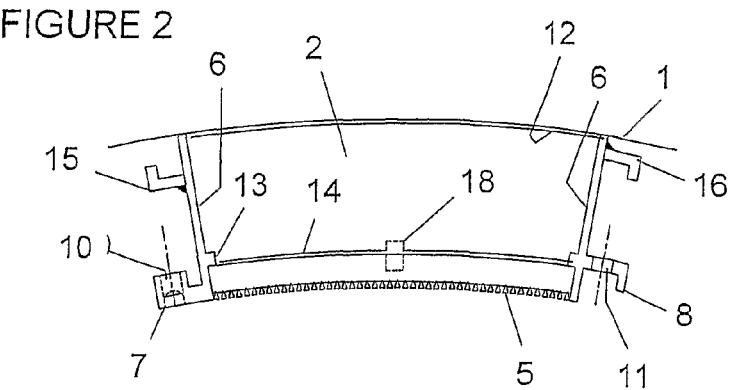
FIG. 2 illustrates a conduit element according to the invention in section on a transverse plane.

One conduit element 2 is depicted in greater detail in FIG. 2, resting against the internal wall of the vessel 1.

Each of the lateral walls 6 bears an assembly profile, a male one 7 on one side, and, on the opposite side, a female one 8, each of these profiles being intended to fit together with a complementary profile formed on the adjacent element. The male profile 7 perfectly extends the filtering front wall 5, so as to ensure surface continuity at the assembly between two elements.

The male profile 7 comprises, at regular intervals along its height, through-orifices 10 into which fastening screws or pins 9 can be inserted. The female profile 8 comprises, at the same intervals, cavities 11 to accept these screws or pins, and which may be threaded depending on the embodiment.

In the embodiment depicted in this figure, the element 2 also comprises a rear wall 12 which rests against the surface of the vessel 1. This wall may be welded to the lateral walls or formed as a one-piece part therewith.

Also fixed, preferably welded, to each lateral wall 6 is a lateral reinforcing flat 13. The flat 13 is attached to the face on the opposite side to the assembly profile, set back slightly from the front wall 5. The lateral flats 13 stiffen the lateral walls and give them better mechanical strength against the radial loads applied in the reactor, by the catalyst and by the fluid.

The lateral flats 13 also serve to support reinforcements 22 and a perforated plate 14 both of which are positioned set back from the front wall 5, and which will be described later on in the description.

The lateral walls 6 of the adjacent elements comprise, on their external face and near their rear ends, complementary assembly stops in the form of a male stop 15 and of a female stop 16. The stops of two adjacent elements fit one inside the other at the time of assembly. The male stop 15 is positioned set back from the male assembly profile 7 and the female stop 16 is positioned set back from the female assembly profile 8, to make the elements easier to mount relative to one another.

These complementary stops, positioned toward the rear of each element, near the wall of the vessel 1, maintain a uniform and constant spacing between the adjacent elements and do so even in the event of unequal and/or time-shifted deformation or expansion of the elements 2 and of the vessel 1.

These assembly profiles and stops respectively create internal hooping and external hooping of the elements 2 installed in the reactor. These hoopings are enough to keep the elements 2 in place when the reactor is in operation, by forming an assembly that is said to be a self-supporting assembly. There is thus advantageously no need to resort to additional components, such as retaining rings, to hold the conduit elements in position as such additional components would disturb the flow of catalyst through the space 3. Further, the radial loads applied to the conduit elements 2 are fully borne by these hoopings, and no radial load due to the weight of catalyst is transmitted as far as the wall of the reactor.

In some embodiments of the invention, the conduit elements have no rear wall, which means that the fluid admitted from the top of the reactor is uniformly distributed throughout the circular volume of the external conduit.

The lateral walls 6 of the elements 2 may be solid, or may be holed so as to allow the fluid to circulate between the various conduit elements 2.

These features notably allow good radial distribution of the fluid in the external conduit, before it is admitted to the bed of particles.

A longitudinal rigid comb 18 is positioned set back from the front wall 5, at right angles thereto and preferably in such a way as to occupy substantially the entire height thereof. This comb 18 enhances the mechanical strength of the wall 5.

The system comprises two conduit elements of special configuration: one is a lead conduit element 27, intended to be the first one installed in the reactor, and the other is a joining element 19, intended to be the last one installed therein. These elements are similar to the other conduit elements 2 described hereinabove in terms of their overall shape, their front walls 5 and their rear walls 12. It is in terms of the profiles borne by their lateral walls 6 that they differ therefrom.

Figure 6:
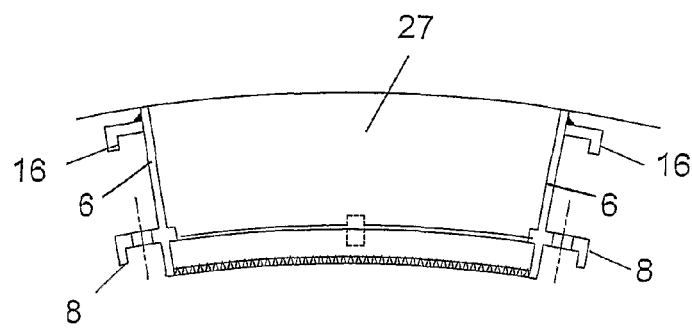
FIG. 6 shows a view in section on a transverse plane of the lead conduit element according to the invention.

The lead element 27 is depicted in FIG. 6. Its lateral walls 6 are both equipped with a female assembly profile 8 and with a female assembly stop 16. This lead element 27 makes subsequent fitting of the joining element 19 easier.

For fitting, the lead conduit element 27 is installed first, and the conventional conduit elements 2 are then installed in the reactor one after the other. They are easily inserted longitudinally therein, from the top, in the middle of the reactor. They are then shifted radially toward the periphery thereof so that they can be positioned against the internal wall of the vessel 1. The male assembly profiles 7 and the male assembly stops 15 are always respectively fitted together with the female assembly profiles 8' and the female assembly stops 16' of the adjacent element already in position. Each new element 2' installed is fixed, inside the reactor, using screws or pins 9, to the last element 2 installed. A peripheral annulus is thus formed by assembling the individual sectors.

Figure 3:
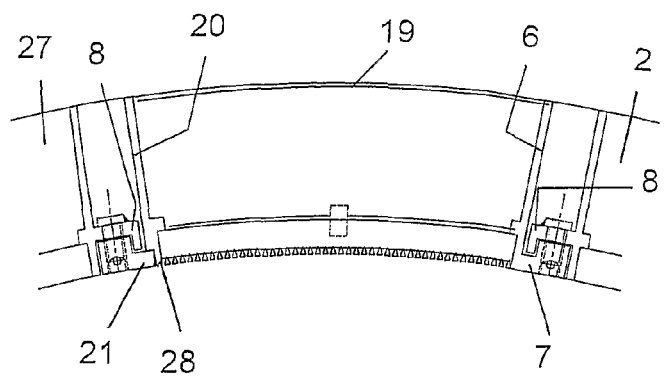
FIG. 3 shows a view in section on a transverse plane of conduit elements assembled with one another, comprising the joining element and the lead element.

In order to join together the first and last elements installed, the reactor comprises a joining element 19, likewise in the form of a hollow conduit element with a filtering front wall 5, which is shown in FIG. 3. In this figure, the assembly stops 15 and 16 have not been depicted.

This element is similar to the elements 2 described hereinabove, at least in respect of its front and rear walls and in respect of one of its lateral walls 6, the one bearing the male assembly profile 7. Its size may differ; it is tailored to suit the particular configuration of the reactor.

Its opposite lateral wall 20, however, has no female assembly profile, so that it can be the last element installed in the annulus, by longitudinal insertion into the reactor, then by being moved radially from the center of the reactor toward the periphery thereof. In place of the female assembly profile, the element 19 comprises, near its front wall 5, a shoulder 28 to accept an adjustable cover strip 21 of the same shape as the male assembly profiles 7. This cover strip 21 covers the female assembly profile of the adjacent element, which is the lead element 27, so as to seal the internal surface of the annulus against particles of catalyst and at the same time provide it with continuity at this junction.

Figure 4:
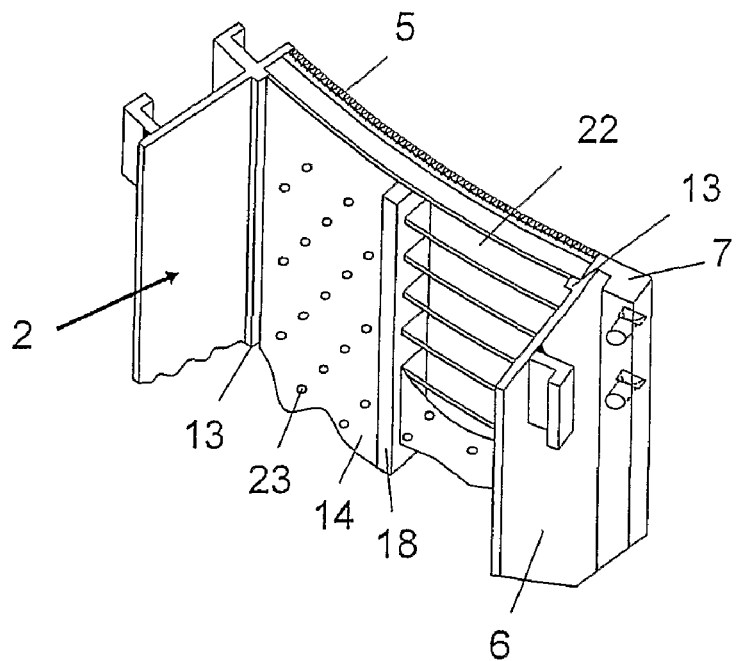
FIG. 4 depicts a view in perspective and part section of a conduit element according to the invention.

For all the conduit elements 2, 2', the lead element 27 and the joining element 19, the filtering front wall 5 is supported at the rear by parallel annular reinforcements 22, as may be seen in FIG. 4. These reinforcements are laterally supported by the lateral flats 13. The comb 18 is positioned in such a way that its teeth are inserted between the reinforcements 22.

To the rear of the reinforcements 22, a perforated plate 14 is fixed to the lateral flats 13. This plate 14 is parallel to the front wall 5, over the entire height thereof. The density of its perforations 23 decreases gradually from the bottom of the reactor upward, so as to force the flow of fluid preferentially into the lower part of the reactor. This makes it possible to ensure that the fluid is circulated even in the high-density lower part of the bed of catalyst and therefore makes it possible to ensure that the catalytic reaction progresses with optimal efficiency.

Figure 5:
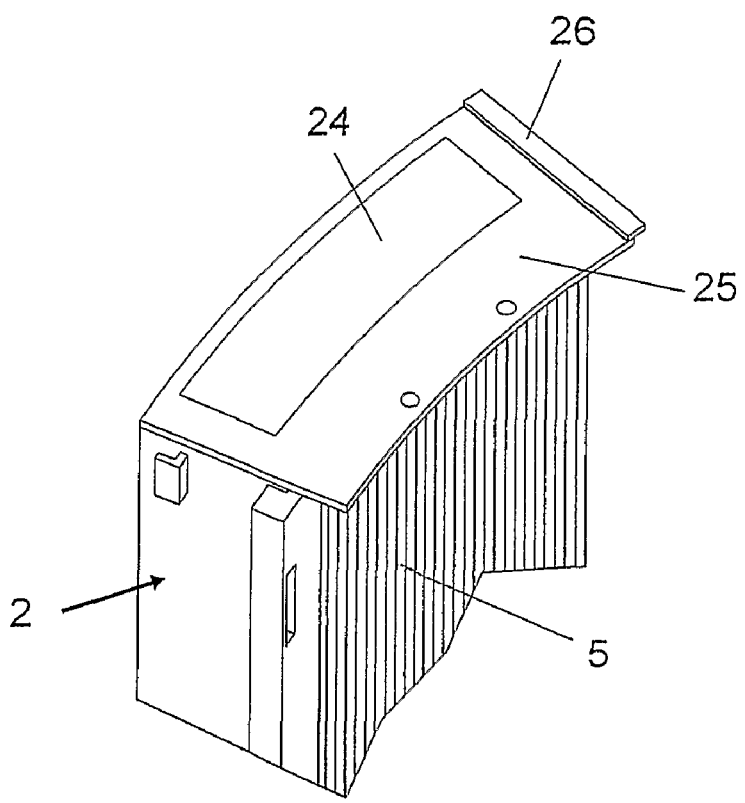
FIG. 5 shows a perspective view of the upper part of a conduit element according to the invention.

At its upper end, each conduit element 2 has an opening 24 for the ingress of fluid, as illustrated in FIG. 5. The size of this opening 24 is adjusted to suit the specific requirements of the reaction. A cover plate 25 blanks off the conduit element around the opening 24. This plate 25 overhangs the adjacent conduit element, so as to seal against the fluid. A cover strip 26 seals between two adjacent plates 25.

In the lower part, again according to the particular requirements of the catalytic reaction, each conduit element 2 may be closed off by a plate which may be solid or filtering in the middle so as to allow the fluid to circulate toward the lower part of the reactor. This plate may be welded or screwed to the reactor support ring.

The foregoing description clearly explains how the invention makes it possible to achieve the objectives assigned to it. In particular, it provides a system for the external retention of a catalyst bed in a radial-flow catalytic reactor, formed of distinct hollow conduit elements that are easy to install and to replace in the reactor, which are assembled with one another in such a way as to provide good mechanical strength against radial loading and against temperature, a uniform surface for contact with the catalyst, with no dead regions, and a uniform radial thickness of the bed of particles of catalyst. The system according to the invention does not require any elements that would disrupt the flow of catalyst, and the reactor equipped with such a system has high catalytic efficiency. It is nonetheless clear from the foregoing that the invention is not restricted to the embodiments specifically described and depicted in the figures and that, on the contrary, it extends to any alternative form achieved using equivalent means.

The invention claimed is:

1. A system for the external retention of a bed of catalyst in a radial-flow catalytic reactor, comprising a plurality of longitudinal hollow conduit elements (2) evenly distributed in a peripheral annulus around a central space (3) containing said catalyst bed, each said element having a front wall (5) that is filtering in respect of the catalyst, for radially admitting a process fluid into said bed of catalyst (3), wherein each said element (2) is laterally bounded by two lateral walls (6) directed radially in the reactor which comprise cooperating assemblers of a male-in-female member type (7, 8) for assembling it with the respectively adjacent elements (2').

2. The system as claimed in claim 1, wherein said assemblers are made of complementary longitudinal profiles (7, 8) positioned near the front end of said lateral walls (6) and configured for ensuring continuity of the internal surface of said peripheral annulus.

3. The system as claimed in claim 1, wherein said lateral walls (6) are solid, or are holed so as to allow said fluid to circulate from one conduit element (2) to another.

4. The system as claimed in claim 1, wherein said lateral walls (6) comprise assembly stoppers of the male-in-female member type (15, 16) that are positioned near the rear end of said lateral walls.

5. The system as claimed in claim 1, wherein said assemblers (7, 8) are fixed together by screw-fasteners (9), which are optionally set into the surface of said peripheral annulus.

6. The system as claimed in claim 1, wherein said lateral walls (6) comprise a lateral reinforcement (13), positioned on the opposite side to said assemblers (7, 8) backwards from said front wall (5).

7. The system as claimed in claim 1, wherein the conduit elements comprise distributors that gradually distribute the fluid along the longitudinal direction.

8. The system as claimed in claim 7, wherein said distributors comprise a perforated plate (14) fixed set back from said catalyst filtering front wall (5) and showing a perforation density that is greater in the lower part than in the upper part of the reactor and which varies along its height.

9. The system as claimed in any claim 1, wherein said catalyst filtering front wall (5) is supported at the rear by parallel annular reinforcements (22), and in that a longitudinal rigid comb (18) is positioned at right angles set back from said wall (5), substantially at the middle thereof, between said reinforcements (22).

10. The system as claimed in claim 1, which comprises a leading hollow conduit element (27), having been intended to be the first one installed in the reactor, and which is provided with a female assembly profile (8) profile (8) on each of its lateral walls (6).

11. The system as claimed in claim 10, which comprises a hollow conduit element (19) capable of joining the peripheral annulus by coming adjacent to said leading element (27) and a shoulder (28), having a shape similar to the male assembly member (17) and capable of accepting adjustable cover strip (21), is provided on one lateral wall (20), and wherein said cover strip is positioned to cover the female assembly profile (8) of said leading element (27) adjacent to said lateral wall and to seal the internal surface of the annulus against the catalyst and to provide it with continuity between said wall (20) and the leading element (27).

12. The system as claimed in claim 1, wherein said conduit elements (2) comprise a filtering rear wall (12) or a solid rear wall (12).

13. A system for the external retention of a bed of catalyst in a radial-flow catalytic reactor, comprising a plurality of longitudinal hollow conduit elements (2) evenly distributed in a peripheral annulus around a central space (3) containing said catalyst bed, each said element having a front wall (5) that is filtering in respect of the catalyst, for radially admitting a process fluid into said bed of catalyst (3), wherein each said element (2) is laterally bounded by two lateral walls (6) directed radially in the reactor which comprise a cooperating means for assembling a male-in-female member type (7, 8) capable of assembling it with the respectively adjacent elements (2').

14. The system as claimed in claim 13, wherein said assembly means are made of complementary longitudinal profiles (7, 8) positioned near the front end of said lateral walls (6) and configured for ensuring continuity of the internal surface of said peripheral annulus.

15. The system as claimed in claim 13, wherein said lateral walls (6) comprise a means for stopping assembly of the male-in-female member type (15, 16) that are positioned near the rear end of said lateral walls.

16. The system as claimed in claim 13, wherein said assembly means (7, 8) are fixed together by a means for screw-fastening (9), which are optionally set into the surface of said peripheral annulus.

17. The system as claimed in claim 13, wherein the conduit elements comprise a means for distributing capable of gradually distributing the fluid along the longitudinal direction.

18. The system as claimed in claim 17, wherein said means for distributing comprises a perforated plate (14) fixed set back from said catalyst filtering front wall (5) and showing a perforation density which varies along its height.

19. The system as claimed in claim 13, which comprises a leading hollow conduit element (27), having been intended to be the first one installed in the reactor, and which is provided with a female assembly member (8) on each of its lateral walls (6).

20. The system as claimed in claim 19, which comprises a hollow conduit element (19) capable of joining the peripheral annulus by coming adjacent to said leading element (27) and a shoulder (28), having a shape similar to the male assembly member (17) and capable of accepting adjustable cover strip (21), is provided on one lateral wall (20), and wherein said cover strip is positioned to cover the female assembly profile (8) of said leading element (27) adjacent to said lateral wall and to seal the internal surface of the annulus against the catalyst and to provide it with continuity between said wall (20) and the leading element (27).

* * * * *

UNITED STATES PATENT AND TRADEMARK OFFICE
CERTIFICATE OF CORRECTION

PATENT NO. : 8,398,930 B2  
APPLICATION NO. : 12/995521  
DATED : March 19, 2013  
INVENTOR(S) : Naderi Page 1 of 1

It is certified that error appears in the above-identified patent and that said Letters Patent is hereby corrected as shown below:

On the Title Page of the patent:

Item (73) reads "Euroslot, Scorbe Clairvaux (FR)", should read
-- EUROSLOT KDSS FRANCE, Scorbe Clairvaux, (FR) --

Signed and Sealed this
Tenth Day of September, 2013

Teresa Stanek Rea
*Acting Director of the United States Patent and Trademark Office*